US008231773B2

(12) United States Patent
Zhang et al.

(10) Patent No.: US 8,231,773 B2
(45) Date of Patent: Jul. 31, 2012

(54) METHOD OF TREATING NANOPARTICLES USING AN INTERMITTENTLY PROCESSING ELECTROCHEMICAL CELL

(75) Inventors: Junliang Zhang, Rochester, NY (US); Susan G. Yan, Fairport, NY (US); Frederick T. Wagner, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1266 days.

(21) Appl. No.: 11/954,074

(22) Filed: Dec. 11, 2007

(65) Prior Publication Data

US 2009/0145772 A1    Jun. 11, 2009

(51) Int. Cl.
*C25D 7/00* (2006.01)

(52) U.S. Cl. ........ 205/144; 204/260; 204/272; 205/704; 205/766; 205/767; 205/768

(58) Field of Classification Search ............... 204/229.9, 204/230.1, 260, 261; 205/57, 144, 524, 530, 205/704, 706, 707, 766, 767, 768; 429/480, 429/481, 483, 487, 497, 500
See application file for complete search history.

(56) References Cited

U.S. PATENT DOCUMENTS

| 3,134,689 | A | | 5/1964 | Pritikin et al. | |
|---|---|---|---|---|---|
| 4,135,996 | A | * | 1/1979 | Bouy et al. | 204/252 |
| 4,272,353 | A | | 6/1981 | Lawrance et al. | |
| 4,588,484 | A | * | 5/1986 | Justice et al. | 205/422 |
| 5,624,544 | A | * | 4/1997 | Deguchi et al. | 204/260 |
| 5,911,865 | A | * | 6/1999 | Yih | 205/149 |
| 6,059,952 | A | * | 5/2000 | Kang et al. | 205/143 |
| 6,306,280 | B1 | * | 10/2001 | Reipa et al. | 205/413 |
| 6,409,895 | B1 | * | 6/2002 | Ponzano | 204/260 |
| 2004/0217007 | A1 | * | 11/2004 | Diel et al. | 204/242 |

OTHER PUBLICATIONS

German Office Action of Application No. DE 10 2008 060 639.1-45, Dated Jan. 21, 2011, 3 pages.
Talbot, Jan B.; Electrocodeposition of Nanocomposite Films; Plating & Surface Finishing; Oct. 2004, pp. 60-63.
Srinivasan, S., "Recent Advances in Solid Polymer Electrolyte Fuel Cell Technology wiht Low Platinum Loading Electrodes", Journal of Power Sources, 29, (1990) pp. 367-387.

\* cited by examiner

*Primary Examiner* — Keith Hendricks
*Assistant Examiner* — Steven A. Friday
(74) *Attorney, Agent, or Firm* — BrooksGroup

(57) ABSTRACT

A method of treating electrically conductive nanoparticles using a dynamic processing electrochemical cell.

13 Claims, 1 Drawing Sheet

METHOD OF TREATING NANOPARTICLES USING AN INTERMITTENTLY PROCESSING ELECTROCHEMICAL CELL

TECHNICAL FIELD

The field to which the disclosure generally relates includes methods of treating nanoparticles.

BACKGROUND

The electrochemical treatment of large quantities of nanoparticles, including coating, stripping, oxidation, reduction, cleaning, dealloying of nanoparticles and so on, has long been a technical barrier for more extensive applications of this technique, in a range of applications including, but not limited to, fuel cells, batteries, and heterogeneous catalysis. Heretofore treatment of nanoparticles has resulted in extremely non-uniform treatment of the nanoparticles.

SUMMARY OF EXEMPLARY EMBODIMENTS OF THE INVENTION

One embodiment of the invention includes a method of treating nanoparticles including using a container as a working electrode and dynamically contacting the nanoparticles with the container so that the nanoparticles are treated.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
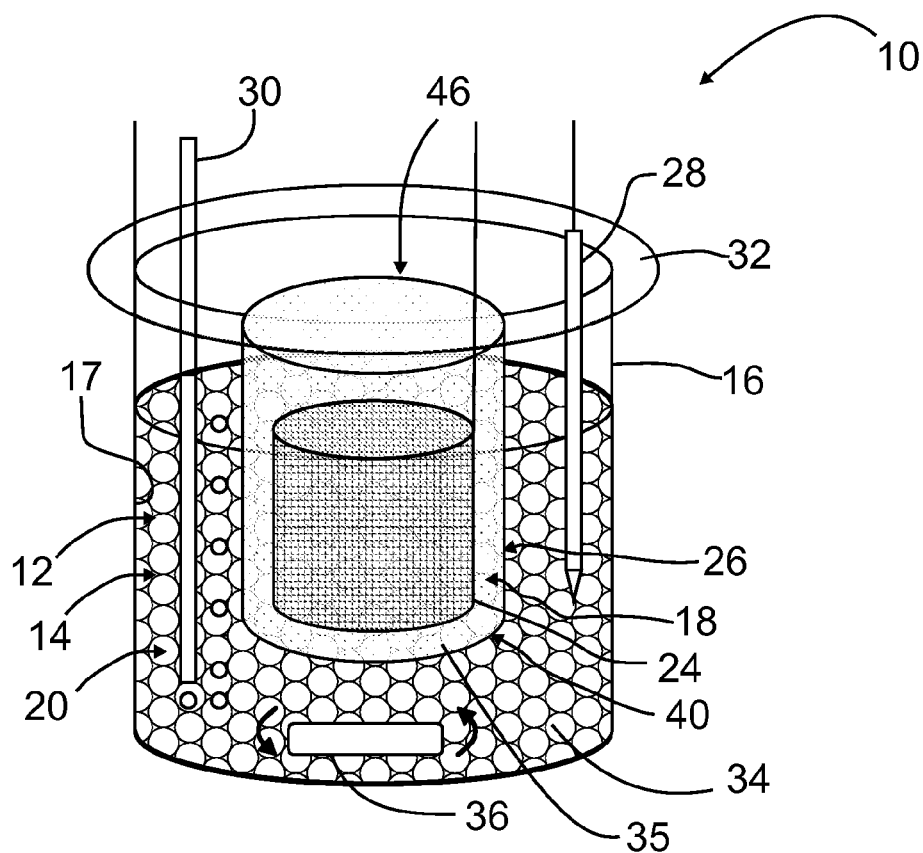
FIG. 1 illustrates an electrochemical cell useful in the treatment of nanoparticles according to one embodiment of the invention.

FIG. 1 illustrates an electrochemical cell 10 according to one embodiment of the invention. A container 16 such as, but not limited to, a glassy carbon or platinum crucible, or a glass beaker covered on the inside with platinum foil is used as the working electrode. Nanoparticles 20 to be treated are immersed in a first electrolyte 12 to form a suspension 14. The nanoparticles 20 may be made from any of a variety of electrically conductive materials. For example, the nanoparticles 20 may include pyrolytic carbon particles or strands of carbon particles fused together. The nanoparticles 20 may also include solid particles including metals or metal oxides. The nanoparticles 20 may also include particles having hollow cores.

One embodiment of the invention includes using electrochemical cell 10 including the container 16 as the working electrode and causing the nanoparticles 20 being treated by the liquid electrolyte 12 to intermittently contact the container 16. A means for flowing 36 the nanoparticles 20 in the container 16 is provided such as a pump, a propeller or a magnetic stir bar. The electrolyte 12 may be an aqueous acid solution including perchloric acid, sulfuric acid, or phosphoric acid. Due to the convective vortex flow of the suspension 14, the nanoparticles 20 intermittently contact an inner surface 17 of the container 16 working electrode. A counter electrode 24 which may be, but is not limited to, a platinum gauze cylinder, may be placed in a second container 46 which may include perforated material 40 such as polytetrafluoroethylene (PTFE) or glass.

Figure 2:
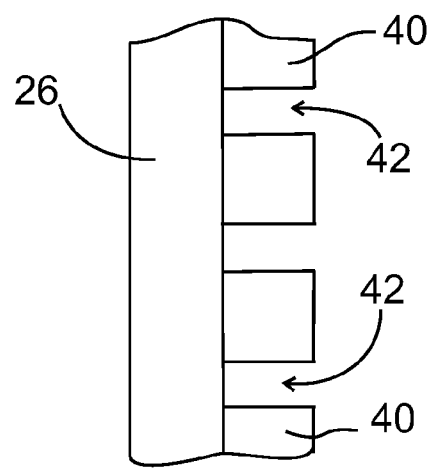
FIG. 2 is an enlarged section view of a container including a perforated material and a membrane wrapped around the same according to one embodiment of the invention.

In one embodiment of the invention the electrochemical cell 10 includes a membrane 26, for example a proton conductive polymer electrolyte membrane, that separates a working electrolyte compartment 34 from a counter electrode compartment 35. As best seen in FIG. 2, the perforated material 40 having a plurality of holes 42 formed therethrough may be wrapped with the proton conductive polymer electrolyte membrane 26. Alternatively, the membrane 26 may be placed inside of the perforated container 40. In yet another embodiment, the perforated container 40 may be eliminated and the membrane 26 may include a support material received therein such as expanded PTFE.

The second container 46 is filled with a second electrolyte 18, such as an aqueous acid solution including perchloric acid, sulfuric acid or phosphoric acid. The electrolyte 18 is completely separated from the suspension 14 in the working electrode side of the membrane 26. The suspension 14 is in the working electrolyte compartment 34 and the second electrolyte 18 is in the counter electrode compartment 35. A reference electrode 28 may be placed in the suspension 14 close to the crucible wall. A gas purging tube 30 may also be inserted in the suspension 14. Suitable choices for the reference electrode 28 include, but are not limited to, a silver/silver chloride electrode, a mercury/Calomel electrode, or a reversible hydrogen electrode. The containers 16, 46 are sealed by a cover 32, which may be polytetrafluoroethylene.

A potential is applied on the electrode 16, versus 28, by using 24 as the counter electrode. The device used to apply the potential may be, for example, a potentiostat (not shown) to treat the nanoparticles 20. This arrangement may be utilized for coating, stripping, oxidation, reduction, cleaning or dealloying the nanoparticles 20. As the suspension 14 is in dynamic convection, the concentration of the reactant species 20 at the inner container surface 17 approaches that in the bulk electrolyte, resulting in a very small resistance in the electrolyte phase. The electronic resistance of the container 16 is small as well. That both of these resistances are small ensures a uniform treatment of the nanoparticles 20. The extension of electrochemical treatment of the nanoparticles can be monitored by watching the current change or the charge integration of the process at the treating potential. For example, when coating a monolayer of copper on Pd/C nanoparticles by under-potential-deposition (UPD) technique, which is an important intermediate step of Pt monolayer to multilayer coating on Pd/C, the potential of the working electrode is held at the UPD potential, and the process is finished as the current approaches zero. By using this design, a uniform electrical treatment of a very large volume of nanoparticles can be achieved in a simple and neat way. The cell design combines some advantages of a polymer electrolyte membrane fuel cell and some of a conventional liquid electrolyte electrochemical cell. In the case when the electrochemical reaction at the counter electrode is not the reverse reaction at the working electrode (for example, when $H_2$ or $O_2$ evolution occurs at the counter electrode), the design can essentially prevent the reaction products ($H_2$ or $O_2$) from diffusing to the working electrode. As the nanoparticles are immersed in the liquid electrolyte and intermittently contact the working electrode, all of the nanoparticles can eventually be uniformly treated and can be easily washed out after the treatment. Neither of these features can be achieved for the catalyst layer in polymer electrolyte membrane fuel cells, in which the catalyst layer is mixed with a solid ionomer phase.

In various embodiments, the polymer electrolyte membrane 26 may include a variety of different types of membranes. The polymer electrolyte membrane 26 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

The electrochemical cell 10 may be used to coat nanoparticles 20 with a catalyst such as platinum to provide a plurality of supported catalyst particles. The supported catalyst particles may be combined with an ionomer which may be the same as the material for the above described membrane 26. The supported catalyst particles and ionomer may be applied to both faces of a polymer electrolyte membrane of a fuel cell. The supported catalyst particles and ionomer may alternatively be applied to a fuel cell gas diffusion media layer or onto a decal backing for later application as desired.

The above description of embodiments of the invention is merely exemplary in nature and, thus, variations thereof are not to be regarded as a departure from the spirit and scope of the invention.

What is claimed is:

1. A method of electrochemically treating electrically conductive nanoparticles comprising:
    providing an electrochemical cell that comprises a first container, as a working electrode, with a suspension that includes nanoparticles immersed in a first electrolyte in the first container, a second container with a second electrolyte in the second container, the second container being received in the first container, a counter electrode placed in the second container, and membrane that separates the suspension in the first container from the second electrolyte in the second container;
    applying a potential between the working electrode and the counter electrode; and
    stirring the suspension in the first container to intermittently contact the nanoparticles with an inner surface of the first container to treat the nanoparticles for coating, stripping, oxidation, reduction, cleaning or dealloying of the nanoparticle.

2. A method as set forth in claim 1 wherein the stirring the suspension comprises rotating a magnetic stirring bar in the first container.

3. A method as set forth in claim 1 wherein the counter electrode comprises a gauze.

4. A method as set forth in claim 1 wherein the counter electrode comprises a gauze comprising platinum.

5. A method as set forth in claim 1 further comprising a gas purge tube received in the first container outside of the second container.

6. A method as set forth in claim 1 wherein the electrochemical cell further comprises a reference electrode received in the first container.

7. A method as set forth in claim 1 wherein the nanoparticles comprise at least one of Pt, Pt alloy, a noble metal, a metal alloy, a metal oxide, or carbon nanoparticles.

8. A method of electrochemically treating electrically conductive nanoparticles comprising:
    providing an electrochemical cell that comprises a first container, as a working electrode, with a suspension that includes nanoparticles immersed in a first electrolyte in the first container, a second container with a second electrolyte in the second container, the second container being received in the first container, a counter electrode placed in the second container, and membrane that separates the suspension in the first container from the second electrolyte in the second container;
    applying a potential between the working electrode and the counter electrode; and
    stirring the suspension in the first container to intermittently contact the nanoparticles with an inner surface of the first container to treat the nanoparticles,
    wherein the membrane comprises a proton conductive polymer electrolyte membrane.

9. A method comprising:
    providing an electrochemical cell comprising a first container as a working electrode, a suspension received in the first container comprising a plurality of nanoparticles and a first liquid electrolyte, a second container received in the first container, and a second liquid electrolyte received in the second container, and a counter electrode comprising a platinum gauze received in the second container, the second container comprising a cylinder comprising polytetrafluoroethylene or glass, and a membrane wrapped around the cylinder, and wherein the membrane completely separates the suspension contained in the first container from the second electrolyte contained in the second container, a reference electrode received in the first container, applying a potential to the working electrode, versus the reference electrode, using the counter electrode, and stirring the suspension to cause the nanoparticles to intermittently contact an inner surface of the first container such that the nanoparticles are coated with platinum using an under-potential-deposition technique.

10. A method as set forth in claim 9 wherein the electrochemical cell further includes a magnetic stirring bar in the first container and wherein the stirring the suspension comprises rotating the magnetic stirring bar.

11. A method as set forth in claim 9 further comprising a cover over the first and second containers.

12. A method as set forth in claim 9 further comprising a gas purging tube received in the first container.

13. A method as set forth in claim 9 wherein the nanoparticles comprise carbon nanoparticles.

* * * * *